(12) United States Patent
Eller et al.

(10) Patent No.: US 6,359,108 B1
(45) Date of Patent: Mar. 19, 2002

(54) METHOD FOR POLYMERIZING CYCLIC ETHER

(75) Inventors: Karsten Eller, Ludwigshafen; Frank Stein, Bad Dürkheim; Christoph Sigwart, Schriesheim; Rainer Becker, Bad Dürkheim; Klaus-Dieter Plitzko, Limburgerhof; Rolf Fischer, Heidelberg; Ulrich Müller, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/423,459
(22) PCT Filed: May 6, 1998
(86) PCT No.: PCT/EP98/02674
§ 371 Date: Nov. 9, 1999
§ 102(e) Date: Nov. 9, 1999
(87) PCT Pub. No.: WO98/51729
PCT Pub. Date: Nov. 19, 1998

(30) Foreign Application Priority Data

May 12, 1997 (DE) .......................... 197 19 875

(51) Int. Cl.⁷ ..................... C08G 59/68; C08G 65/10
(52) U.S. Cl. ................... 528/411; 502/80; 502/83; 525/409; 528/413; 528/416; 568/617; 568/679
(58) Field of Search ............... 528/411, 413, 528/416; 525/409; 568/617, 679; 502/527.24, 527.14, 527.15, 80, 83

(56) References Cited

U.S. PATENT DOCUMENTS

| | | | |
|---|---|---|---|
| 2,499,725 A | * | 3/1950 | Copelin |
| 3,341,488 A | * | 9/1967 | O'Conner ............... 525/409 X |
| 3,358,042 A | * | 12/1967 | Dunlop et al. |
| 4,163,115 A | * | 7/1979 | Heinsohn et al. ........... 560/240 |
| 4,189,566 A | * | 2/1980 | Mueller et al. ............. 528/408 |
| 4,230,892 A | * | 10/1980 | Pruckmayr ................... 568/617 |
| 4,243,799 A | * | 1/1981 | Mueller et al. ............. 528/409 |
| 4,303,782 A | * | 12/1981 | McHale et al. ............. 528/416 |
| 4,329,445 A | * | 5/1982 | Delpesco .................... 528/416 |
| 4,482,411 A | * | 11/1984 | Stephens et al. ........... 149/19.4 |
| 4,677,231 A | * | 6/1987 | Aoshima et al. ............ 568/617 |
| 4,757,040 A | * | 7/1988 | Guan et al. ................ 502/80 X |
| 5,149,862 A | * | 9/1992 | Dorai et al. ................ 560/240 |
| 5,504,051 A | * | 4/1996 | Nakamura et al. .. 502/527.14 X |
| 5,770,678 A | * | 6/1998 | Drysdale et al. ........ 528/411 X |
| 5,773,648 A | * | 6/1998 | Becker et al. .............. 560/240 |
| 5,886,138 A | * | 3/1999 | Müller ................... 528/416 X |

FOREIGN PATENT DOCUMENTS

| | | | |
|---|---|---|---|
| CA | 2224294 | * | 2/1997 |
| DE | 2760272 | * | 10/1977 |
| DE | 4433606 | * | 3/1996 |
| DE | 19527532 | * | 1/1997 |
| EP | 003112 | * | 7/1979 |
| EP | 083970 | * | 7/1983 |
| EP | 250168 | * | 12/1987 |
| EP | 286454 | * | 10/1988 |

OTHER PUBLICATIONS

Meerwein et al., *Angew. Chem.*, 72, 1960, 927–934.*
Figueras, *Catal. Rev.—Sci. Eng.*, 30(3), 1988, 457–499.*
Jones, *Catalysis Today*, 2, 1988, 357–367.*

* cited by examiner

Primary Examiner—Richard D. Lovering
(74) Attorney, Agent, or Firm—Keil & Weinkauf

(57) ABSTRACT

A process for polymerizing cyclic ethers over a heterogeneous catalyst comprises using a heterogeneous catalyst comprising one or more pillared interlayered clays (PILCs).

10 Claims, No Drawings

METHOD FOR POLYMERIZING CYCLIC ETHER

This application is a 371 of PCT/EP98/02674, filed May 6, 1998.

The present invention relates to a process for polymerizing cyclic ethers over a heterogeneous catalyst comprising one or more pillared interlayered clays (PILCs).

Polytetrahydrofuran (PTHF), also known as poly (oxybutylene glycol), is an intermediate for the preparation of polyurethane, polyester and polyamide elastomers, where it is used as diol component. The incorporation of PTHF renders these polymers soft and flexible, which is why PTHF is also known as a soft segment component for these polymers. Polytetrahydrofuran monoesters of monocarboxylic acids are used, for example, as plasticizers (U.S. Pat. No. 4,482,411), impregnating agents, monomers (EP-A 286 454), emulsifiers and dispersants, and are also employed for deinking in the recycling of waste paper.

The cationic polymerization of tetrahydrofuran (THF) using catalysts has been described by Meerwein et al. (Meerwein et al. (1960) Angew. Chem. 72, 927). The catalysts used either are preshaped catalysts or are formed in situ in the reaction mixture. In the latter case, oxonium ions which initiate the THF polymerization are generated in the reaction mixture using strong Lewis acids such as boron trichloride, aluminum trichloride, tin tetrachloride, antimony pentachloride, ferric chloride or phosphorus pentafluoride or strong Bronsted acids such as perchloric acid, tetrafluoroboric acid, fluorosulfonic acid, chlorosulfonic acid, hexachlorostannic acid, iodic acid, hexachloroantimonic acid or tetrachloroferric acid, and using reactive compounds called promoters such as alkylene oxides, eg. ethylene oxide, propylene oxide, epichlorohydrin or butylene oxide, oxetanes, orthoesters, acetals, α-halo ethers, benzyl halides, triarylmethyl halides, acid chlorides, β-lactones, carboxylic anhydrides, thionyl chloride, phosphorus oxychloride or sulfonic acid halides. However, only a few of the multiplicity of catalyst systems have gained industrial importance since some of them are highly corrosive and/or in the course of PTHF preparation give rise to colored products of limited utility. Moreover, many of these catalyst systems are not true catalysts but must be employed in stoichiometric amounts relative to the macromolecule to be prepared and are consumed in the course of the polymerization. The preparation of PTHF using fluorosulfonic acid as catalyst according to U.S. Pat. No. 3,358,042, for instance, requires the use of about two molecules of fluorosulfonic acid for each molecule of PTHF. The use of halogen-containing catalysts has the particular disadvantage that halogenated byproducts are formed in PTHF polymerization which are difficult to remove from pure PTHF and adversely affect the properties thereof.

In the preparation of PTHF in the presence of the abovementioned promoters, these promoters are incorporated into the PTHF molecule as telogens so that the primary product of THF polymerization is not PTHF but a PTHF derivative, for example a PTHF diester or disulfonate from which PTHF has to be liberated in a further reaction, for example by saponification or transesterification (cf. U.S. Pat. No. 2,499,725 and DEA 2 760 272). Telogens are generally compounds which cause chain termination and/or chain transfer in the polymerization. If alkylene oxides are used as promoters, these also act as comonomers and are incorporated into the polymer which leads to the formation of THF-alkylene oxide copolymers which have different application properties than PTHF.

PTHF may be prepared in one step by polymerizing THF in the presence of water, 1,4-butanediol or low molecular weight PTHF oligomers. If 2-butyne-1,4-diol is used as telogen, copolymers of THF and 2-butyne-1,4-diol are produced which, however, may be converted into PTHF by hydrogenating the triple bonds contained therein.

U.S. Pat. No. 5,149,862 discloses the use of sulfate doped zirconium dioxide as acidic heterogeneous polymerization catalyst which is insoluble in the reaction medium. A mixture of acetic acid and acetic anhydride is added to the reaction medium to accelerate the reaction, since the polymerization is very slow without these promoters and conversion over 19 hours is only 6%. This process gives rise to PTHF diacetates which have to be converted into PTHF subsequently by saponification or transesterification.

PTHF diesters are likewise formed in the polymerization of THF using bleaching earth catalysts, as described in EP-A 0 003 112.

U.S. Pat. No. 4,303,782 uses zeolites for the preparation of PTHF. The THF polymers obtainable by this process have very high average molecular weights ($M_n$=250.000–500.000 D) and have not found general acceptance for the abovementioned applications. The process has therefore likewise attained no industrial importance.

DE 4 433 606 describes for example the preparation of PTHF in one step by polymerizing THF over heterogeneous supported catalysts which comprise a catalytically active amount of an oxygen-containing molybdenum and/or tungsten compound on an oxidic support material and which have been calcined at from 500 to 1000° C. after application of the precursor compounds of the oxygen-containing molybdenum and/or tungsten compounds onto the support material precursor. These catalysts have the disadvantage that expensive zirconium dioxide is used as support material.

It is an object of the present invention to provide a process which enables the polymerization of cyclic ethers to be performed in an advantageous manner, especially with high space-time yields, and without the disadvantages described above.

We have found that this object is achieved by a process for polymerizing cyclic ethers over a heterogeneous catalyst comprising one or more pillared interlayered clays (PILCs), which are known from Figueras, F., Catal. Rev. Sci Eng. 30(3) (1988), 457 or Jones, Catal. Today 2 (1988) 357, for example.

PILCs are generally layer structures intercalated with one or more metal compounds in the form of pillars (cf., for example, FIG. 2 in Figueras, F. (1988), supra). The interlayer distance is generally from about 4 to 80 Å, preferably from about 8 to 30 Å, especially from about 8–25 Å. The space which is opened up between the layer structures by the intercalated metal compounds is available as pore volume for the reactants of the polymerization of the invention. Additional pore volume is created, for example, by delamination, ie. "house of cards" structures are formed.

Preferred metal compounds for the pillars include oxides and/or sulfides of elements of main groups III and IV of the Periodic Table of the Elements, in particular of aluminum, gallium, indium, thallium, silicon, germanium, tin or lead, especially aluminum, gallium or silicon, or of elements of the transition groups, preferably of titanium, zirconium, hafnium, vanadium, niobium, tantalum, chromium, molybdenum, tungsten, manganese or iron, especially of titanium, zircomium, vanadium, tantalum, chromium or iron, which may be present as mixtures with one another or as mixtures with other oxides and/or sulfides, eg. of magnesium, boron, cobalt or nickel. Oxidic pillars are preferred.

Examples of useful metal oxides include $Al_2O_3$, $ZrO_2$, $TiO_2$, $Cr_2O_3$, $Ga_2O_3$, $SiO_2$, $Ta_2O_5$, $Fe_2O_3$, and $V_2O_5$. Examples of other oxides that may be present include MgO, $B_2O_3$, $Co_2O_3$ or NiO. A mixture of $Al_2O_3$ and MgO which results in a mixed aluminum/magnesium oxide is especially preferred. Examples of sulfides include $Fe_2S_3$.

Metal compounds having perovskite structure, for example $LaCoO_3$, $LaNiO_3$, $LaMnO_3$ and/or $LaCuO_3$, are also suitable as pillars (cf. WO 92/00808, for example).

The amount of intercalated metal is preferably about 1–50% by weight, in particular 2–35% by weight, based on the finished PILC and calculated as % by weight of metal.

Layer compounds suitable for preparing PILCs are preferably sheet silicates, especially clays. Examples of clay minerals include smectite minerals such as montmorillonite in pure form or as bentonite constituent. Other examples of smectites are beidellite, hectorite, nontronite, sauconite or saponite (cf., for example, U.S. Pat. No. 5,409,597, Table 1). Other examples of clay minerals are vermiculite, mica and taeniolite and of sheet silicates are kanemite, ilerite, magadiite, makatite or kenyaite.

Other examples of suitable layer compounds are α-zirconium phosphate, tetrasilicon mica, brucite, silicic acid type I or rectorite (cf. Vaughan, D. E. W. (1988) "Developments in Pillared Interlayered Clays" in Perspectives in Molecular Sieve Science (Flank, W. H. & Whyte, Th. E. Jr. eds.), for example) ACS Symposium Series, 368, 308–323, Chapter 19, American Chemical Society; Szostak, R. & Ingram, C. (1995) "Pillared Layered Structures (PLS): From Microporous to Nano-phase Materials" in Catalysis by Microporous Materials, Studies in Surface Science and Catalysis vol. 94, 13 (Beyer, H. K. et al., eds.) Elsevier Science B. V.).

For simplicity, PILC as used herein also includes other pillared layered structures not prepared from clay minerals.

PILCs are generally prepared from commercially available naturally occuring or synthetic, untreated or pretreated layer compounds (cf. Mokaya, R. & Jones, W. (1994) J. Chem. Soc. Chem. Commun., 929–930 or WO 95/14530, for example).

One or more metal compounds may be intercalated into pretreated or untreated layer compounds, for example, by the following generally known process (cf. U.S. Pat. No. 4,238,364 or WO 95/14530, for example).

Firstly, the layer compound(s) which is/are generally negatively charged is/are dispersed in a dispersion medium such as water and subsequently mixed with a solution comprising one or more oligomeric hydroxide ions of the metals cited above, the ions being generally positively charged. The metal hydroxide solution may, for example, be prepared by alkaline hydrolysis of a corresponding salt solution by methods known to those skilled in the art. Useful starting compounds include $AlCl_3$, aluminum chlorohydrate, aluminum nitrate, aluminum acetate, zirconyl chloride, zirconyl nitrate, titanyl chloride, titanyl nitrate, titanium tetrachloride, chromium(III) nitrate, iron(III) nitrate, tin(IV) chloride, tin(IV) nitrate, tin(IV) acetate. Solutions of these salts are used to prepare the corresponding hydroxides, for example using aqueous ammonia solution, sodium hydroxide solution or sodium carbonate solution. Alternatively, the hydroxides may be obtained by adding diluted or weak acids such as acetic acid to water soluble hydroxo complexes of the corresponding metals. It is likewise possible to obtain the hydroxides by hydrolysis of organometallic compounds, for example of the alcoholates of the corresponding metals, eg. zirconium tetraethanolate, zirconium tetraisopropylate, titanium tetramethanolate, titanium tetraisopropylate. For the purposes of the present invention, "hydroxides" is a collective term for the oligomeric ions of the metals cited above which may, for example, also contain oxide hydrates, polymeric hydroxo complexes or other anions such as chloride or alcoholate ions. The suspensions are then stirred at, for example, about 0–100° C., preferably at about 20–95° C., for about 30 min–100 h and the layer compound is removed by, for example, filtration or centrifugation, washed eg. with deionized water and usually dried in air or under an inert gas atmosphere, eg. nitrogen, at about 100–160° C. and calcined at about 150–600° C., preferably about 200–500° C., for about 2–16 hours. Freeze-drying is also possible. Examples of positively charged metal hydroxides are $[Al_{13}O_4(OH)_{24}(H_2O)_{12}]^{7+}$ or $[Zr_4(OH)_8(H_2O)_{16}]^{8+}$ leading to aluminum oxide or zirconium oxide compounds ("pillars"), ie. Al- or Zr-PILCs, following intercalation and calcination.

In a further embodiment, the layer compounds are treated with one or more acids prior to or after intercalation of one or more metal compounds and prior to the shaping procedure which is described in detail below, since the acid treatment may increase the pore volume and the activity of the PILCs. Preference is given to acid treatment using an inorganic acid such as hydrochloric acid, hydrofluoric acid, sulfuric acid, phosphoric acid and/or an organic acid such as oxalic acid. Acid treatment generally utilizes about 0.001–20 N, preferably about 0.1–10 N, acid at about 0–150° C. for about 1–100 hours, preferably about 1–24 hours, in an aqueous slurry of the layer mineral. Following removal and washing, the material is generally calcined at about 150–600° C., preferably at about 200–500° C., for about 2–16 hours.

In an alternative embodiment, the layer compounds may additionally be acid treated after the shaping procedure which is described in detail below in order to exchange residual alkali metal and alkaline earth metal ions for hydrogen ions. In this case, the layer compound is generally acid treated using an acid of about 3–25% strength at about 60–80° C. for about 1–3 hours, dried at about 100–160° C. and calcined at about 200–600 C. In particular, the acid treatment of $ZrO_2$-, $TiO_2$- or $Fe_2O_3$-PILCs, for example with sulfuric acid, gives rise to PILCs having sulfated metal oxide pillars and particular thermal stability (Farfan-Torres, E. M. & Grange, P., Catal. Sci. Technol. 1 (1991) 103–109).

A further way of exchanging residual alkali metal and alkaline earth metal ions for hydrogen ions is treatment with ammonium and/or amine salts. To this end, the layer compounds are treated, prior to or after intercalation with one or more metal compounds, with an about 0.1–40% by weight strength, preferably about 5–30% by weight strength, ammonium salt solution such as an ammonium chloride solution and/or an ammonium nitrate solution and/or a salt solution of a volatile amine, for example ethylamine, in an aqueous slurry of the layer compound at about 0–100° C. for about 1–100 hours, preferably about 1–24 hours. Following removal and washing, the material is generally calcined at about 150–600° C., preferably at about 200–500° C., for about 2–16 hours to remove again the ammonia or the volatile amine, respectively.

In another embodiment, the layer mineral is fluorinated, prior to or after intercalation, using one or more fluorides, for example ammonium fluoride, either replacing the hydroxyl groups of the layer mineral by fluoride (cf. U.S. Pat. No. 5,308,812, for example) and/or fluorinating the intercalated metal oxides (cf. U.S. Pat. No. 5 409 597, for example).

In another embodiment, the layer compound was additionally doped with metal ions, in particular transition metal ions, for example with titanium, zirconium, niobium, molybdenum, tungsten, rhenium, nickel, iron, cobalt ions, and/or with rare earth metal ions such as cerium, yttrium and/or lanthanum ions, prior to or after intercalation of one or more metal oxides and prior to or after the shaping procedure (cf. U.S. Pat. No. 4,238,364 or Jiang et al. in Proc. 9$^{th}$ Int. Zeolite Conf. 2 (1992) 631–638, for example). In a preferred embodiment, the preshaped PILC is placed in a flow tube and a solution of metal ions, for example in the form of a halide, an acetate, an oxalate, a citrate and/or a nitrate, is passed over it at about 20–100° C. Another way of doping the catalysts is impregnation of the PILC with a solution, for example an aqueous or alcoholic solution, of the transition metal salts described above. Subsequently, the material is dried and additionally calcined under the conditions which have already been described in detail above, if desired. It may also be advantageous to subject the metal-doped PILC to an aftertreatment with hydrogen and/or steam.

The PILC to be used for the process of the invention can generally either be shaped as such, or with a binder preferably in a ratio of from about 98:2 to about 40:60, to give shaped articles, for example extrudates or pellets. Suitable binders are various aluminas, preferably boehmite (AlOOH), amorphous aluminosilicates, silica, preferably finely divided silica, finely divided titania and/or clays such as kaolin. After the shaping procedure, the extrudates or compacts are advantageously dried at about 110–120° C. overnight and then calcined at about 150–600° C., preferably at about 200–500° C. for about 2–16 hours, it being possible for the calcination to take place directly in the polymerization reactor. If the process of the invention is carried out in suspension mode, the heterogeneous catalysts may be used as a powder or, if the heterogeneous catalyst is arranged in a fixed bed, as shaped articles, for example in the form of cylinders, spheres or granules. The arrangement of the heterogeneous catalyst in a fixed bed is preferred, in particular if, for example, loop reactors are used or if the process is carried out continuously.

The heterogeneous catalysts described above generally have a BET surface area of about 50–400 $m^2g^{-1}$, preferably of about 60–300 $m^2g^{-1}$, in particular of 100–300 $m^2g^{-1}$, and are surprisingly very advantageous for the polymerization of cyclic ethers. This property was particularly surprising since the catalysts have hitherto been used mostly in petrochemical processes only, for example as catalysts for alkylations, isomerizations or cracking of hydrocarbons, ie. in processes which are not related to the process of the invention.

Useful cyclic ethers are in particular cyclic ethers of the formula (I)

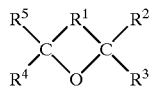

(I)

where $R^1$ is a bond or 1–8 carbon atoms, preferably 1–4 carbon atoms, especially 2 carbon atoms, which may be substituted with a radical $R^6$ and/or $R^7$, and $R^2$, $R^3$, $R^4$, $R^5$, $R^6$ and $R^7$ are each independently of one another hydrogen, a saturated or mono- or polyunsaturated alkyl group having 1–4 carbon atoms or an aryl group having 6 carbon atoms, where $R^2$, $R^3$, $R^4$, $R^5$, $R^6$ and/or $R^7$ may be linked via 2–8 carbon atoms, preferably 4–5 carbon atoms, which may be substituted with one or more radicals like $R^6$ and/or $R^7$. Particularly preferred cyclic ethers include ethylene oxide, propylene oxide, oxetane, tetrahydrofuran (THF), tetrahydropyran, 2-methyltetrahydrofuran, 3-methyltetrahydrofuran and styrene oxide, especially THF, 2-methyltetrahydrofuran or 3-methyltetrahydrofuran, or mixtures of one or more of the cyclic ethers cited with at least one telogen compound selected from the group consisting of water, alkanediols, alkenediols or alkynediols having each 1–12 carbon atoms, preferably 1–6 carbon atoms, in particular 1–4 carbon atoms, especially water, 1,4-butanediol and/or 2-butyne-1,4-diol, polytetrahydrofuran (PTHF) having a molecular weight of about 200–700 dalton, a monocarboxylic acid having 1–10 carbon atoms, preferably 1–8 carbon atoms, particularly formic acid, acetic acid, propionic acid, 2-ethylhexanoic acid, acrylic acid and/or methacrylic acid, and/or a carboxylic anhydride of mono-carboxylic acids having 2–20 carbon atoms, preferably 2–8 carbon atoms, in particular acetic anhydride, propionic anhydride and/or butyric anhydride, especially water, 1,4-butanediol, formic acid, acetic acid, 2-butyne-1,4-diol and/or acetic anhydride. Particular preference is given to a mixture of THF and 1,4-butanediol, preferably of 1 mol THF and about 0.1–15 mol 1,4-butanediol, of THF and a 1,4-butanediol/water mixture, of THF and low molecular weight PTHF or of THF and acetic anhydride.

In principle it is possible to use any cyclic ether for the catalytic polymerization, ie. including commercially available cyclic ethers or cyclic ethers which have been prepurified by acid treatment or distillation. THF prepurified by acid treatment is described in EP-A-0 003 112, for example.

The telogens are preferably dissolved in the cyclic ether itself, for example in THF. Furthermore, it is possible to control the average molecular weight of the polymerization product via the amount of telogen used. The higher the telogen content of the reaction mixture, the lower the average molecular weight of the polymerization product. It is thereby possible, for example, to prepare PTHF or the corresponding PTHF copolymers having average molecular weights of about 250–10000 in a controlled manner depending on the telogen content of the polymerization mixture. The process of the invention is preferably employed to prepare PTHF or the corresponding PTHF copolymers or the corresponding derivatives having average molecular weights of about 500–10000 dalton, especially about 650–5000 dalton. To this end, the corresponding telogen is added in an amount of about 0.01–20 mol %, preferably about 0.05–10 mol % and more preferably about 0.1–8 mol %, based on the amount of cyclic ether, eg. THF, used.

For instance, the telogen 2-butyne-1,4-diol is used for the catalytic preparation of polyoxyalkylene glycols containing C—C triple bonds or C—C double bonds as described in detail in WO 96/27626, for example, or for the catalytic preparation of a copolymer of THF and 2-butyne-1,4-diol as described in detail in DE 195 275 32, for example. Otherwise, reference is also made to DE 44 33 606 or WO 96/09335 where the catalytic preparation of PTHF and PTHF copolymers is described in detail.

The catalytic polymerization is generally carried out at about 0–80° C., preferably at from about 25° C. to the boiling temperature of the reaction mixture, for THF up to 66° C., for example. The pressure applied is generally not critical for a successful polymerization by the process of the invention, and the polymerization is generally carried out at atmospheric pressure or under autogenous pressure of the polymerization system. To prevent the formation of ether peroxides, preference is generally given to polymerizing under an inert gas atmosphere, eg. nitrogen, hydrogen, carbon dioxide or noble gases such as argon, preferably nitrogen.

The process of the invention can be carried out continuously or batchwise, a continuous process being generally preferred for economic reasons. In the batch process, the cyclic ether(s), eg. THF, the corresponding telogen(s) and the catalyst(s) are generally reacted at the abovementioned temperatures in a stirred tank or in a loop reactor until the desired conversion of cyclic ether is achieved. The reaction time may be about 0.5–40 hours, preferably about 1–30 hours, depending on the amount of catalyst added. The catalysts are generally used in an amount of about 1–90% by weight, preferably about 4–70% by weight, in particular about 8–60% by weight, based on the weight of the cyclic ether(s), eg. THF.

The reaction effluent is worked up, for example in the batchwise process, by removing the catalyst present in the effluent, conveniently by filtration, decanting or centrifugation, and generally distilled, and unconverted THF is usually distilled off and low molecular weight PTHF may be removed from the polymer by distillation under reduced pressure, if desired. The low molecular weight PTHF may be recycled into the polymerization to act as telogen and converted into PTHF having a higher molecular weight.

Products of the catalytic polymerization reaction are PTHF, PTHF derivatives and/or copolymers of THF and at least one of the abovementioned compounds, for example a PTHF monoester derived from the reaction of THF and a monocarboxylic acid, a PTHF diester derived from the reaction of THF and a carboxylic anhydride, or THF/butynediol copolymers derived from the reaction of THF and 2-butyne-1,4-diol. The derivatives or copolymers may then be converted directly into PTHF by saponification or hydrogenation by generally known methods which have already been mentioned above.

It is particularly surprising that the polymerization of cyclic ethers, in particular the polymerization of THF, especially using water and/or 1,4-butanediol and/or low molecular weight PTHF and/or acetic anhydride as telogen, can be achieved according to the process of the invention with high space-time yields in one step and therefore in a particularly advantageous manner. The process of the invention is also particularly advantageous in that it utilizes low molecular weight, open-chain PTHF having a molecular weight of about 200–700 dalton (low molecular weight PTHF) as telogen. Since PTHF and 1,4-butanediol have two hydroxyl groups, they are not only incorporated at the ends of the PTHF chain as telogens, but also incorporated into the PTHF chain as monomers.

The Examples which follow illustrate the invention.

EXAMPLES

The molecular weight distribution (polydispersity D) of the polymers prepared in the Examples was calculated from the ratio of the weight average molecular weight ($M_w$) to the number average molecular weight ($M_n$) according to the equation $$M_w/M_n = D.$$

$M_w$ and $M_n$ were determined by gel permeation chromatography using a standardized polystyrene for calibration. From the chromatograms obtained, the number average $M_n$ was calculated according to the equation $$M_n = \Sigma c_i / (\Sigma (c_i / M_i))$$

and the weight average $M_w$ was calculated according to the equation $$M_w = \Sigma c_i M_i / \Sigma c_i,$$

where $c_i$ is the concentration of the individual polymer species i in the polymer mixture and $M_i$ is the molecular weight of the individual polymer species.

1. Catalyst Preparation 1.1 Catalyst A

Al-PILC (According to the Method of Diano et al., Microp. Mat. 2 (1994) 179)

28.5 g of $AlCl_3 6H_2O$ are dissolved in 584 g of distilled water. A solution of 10 g of NaOH in 1.09 l of distilled water is added. The initial cloudiness disappears on stirring at 50 °C. for 1 h. 0.75 l of this solution are added to a suspension of 10 g of sodium montmorillonite in 2 l of distilled water. The pH is adjusted to 5.6 with 1.8 g of 25% strength ammonia solution and the mixture is stirred at 80° C. for 3 h. The Al-PILC thus formed is separated off by filtration, washed free of chloride, dried at 100° C. for 2 h and calcined at 200° C. for 5 h. The Al content is 16.3% as determined by aluminum analysis; the BET surface area is 185 $m^2g^{-1}$, the micropore area is 87 $m^2g^{-1}$. The X-ray diffraction pattern shows a $d_{001}$ reflection at 18.5 Å.

1.2 Catalyst B

Zr-PILC (modification of Example 17 of U.S. Pat. No. 4,176,090)

106.3 g of $ZrOCl_2 8H_2O$ are dissolved in 360 ml of distilled water and refluxed for 24 h. The solution is diluted to give a volume of 1,5 l, 30 g of acid-activated monimorillonite are added at room temperature and the mixture is stirred for 1 h. The Zr-PILC thus formed is separated off by filtration, washed twice with 1.5 l of hot distilled water each time, dried at 110 °C. for 2 h and calcined at 250° C. for 3 h. The BET surface area is 284 $m^2g^{-1}$.

1.3 Catalyst C

Ti-PILC (According to the Method of Sychev et al., Proc. Polish-German Zeolite Colloquium, Rozwadowski (Ed.), Nicholas Copernicus University Press: Toruń, 1992)

71.1 g of $Ti(O^iPr)_4$ are slowly added dropwise to 1 l of 1 N hydrochloric acid and the mixture is stirred at room temperature for 3 h. This solution is added to a suspension of 20 g of natural montmorillonite in 2 l of a 1:1 mixture of 1 N HCl and acetone. After stirring at room temperature for 3 h, the Ti-PILC thus formed is separated off by filtration, washed with distilled water, dried at 100°° C. for 2 h and calcined at 300°° C. for 3 h. The BET surface area is 117 $m^2g^{-1}$.

1.4 Catalyst D

Ti-PILC (Modification of the Method of Sychev et al., Supra)

71.1 g of $Ti(O^iPr)_4$ are slowly added dropwise to 1 l of 1 N hydrochloric acid and the mixture is stirred at room temperature for 3 h. This solution is added to a suspension of 20 g of acid-activated montmorillonite in 2 l of a 1:1 mixture of 1 N HCl and acetone. After stirring at room temperature for 3 h, the Ti-PILC thus formed is separated off by filtration, washed with distilled water, dried at 100° C. for 2 h and calcined at 300° C. for 3 h. The BET surface area is 257 $m^2g^{-1}$. This Example demonstrates that it is also possible to use a pretreated sheet silicate as starting material.

1.5 Catalyst E

Al-PILC (Modification of the Method of U.S. Pat. No. 4,176,090, Example 10)

65 g of 50% strength Chlorhydrol solution (aluminum chlorohydrate obtained from Reheis, Ireland) are diluted with 100 ml of distilled water. 60 g of a natural montmorillonite are added and the mixture is stirred at 65° C. for 1 h. The Al-PILC thus formed is separated off by centrifugation, washed twice with 250 ml of hot distilled water each time, dried at 110° C. for 2 h and calcined at 250° C. for 3 h. The Al content is 15.7% as determined by analysis; the BET surface area is 87 $m^2g^{-1}$, the micropore area is 50 $m^2g^{-1}$. The X-ray diffraction pattern shows a $d_{001}$ reflection at 18.6 Å. 20.6 g of this Al-PILC are suspended in 1 of 0.5M $H_2SO_4$ and stirred at 60° C. for 6 h. The Al-PILC is separated off by filtration, washed twice with distilled water, dried at 110° C. for 2 h and calcined at 250° C. for 3 h. The BET surface area is now 103 $m^2g^{-1}$. This Example demonstrates one method of subsequent ion exchange.

1.6 Catalyst F

Al—Mg-PILC (modification of the method of U.S. Pat. No. 4,248,739, Example 9)

54 g of 50% strength Chlorhydrol (cf. Example 1.5) are diluted with distilled water to give a volume of 1.6 l. A solution of 41 g of $MgCl_2 6H_2O$ in 400 ml of distilled water is added. After stirring for 3 days, 100 g of a natural montmorillonite are added and the mixture is stirred at 70° C. for 1 h. The Al—Mg-PILC thus formed is separated off by filtration, washed twice with 1 l of hot distilled water each time, dried at 110° C. overnight and calcined at 200° C. for 5 h. The Al content is 15.8%, the Mg content is 1.2%, as determined by analysis; the BET surface area is 105 $mg^2g^{-1}$, the micropore area is 52 $m^2g^{-1}$. The X-ray diffraction pattern shows a $d_{001}$ reflection at 18.9 Å. 51.9 g of this Al—Mg-PILC are suspended in 1l of 5M $H_2SO_4$ and stirred at 60° C. for 6 h. The Al—Mg-PILC is separated off by filtration, washed with distilled water, dried at 110° C. overnight and calcined at 200° C. for 5 h. The BET surface area is now 193 $m^2g^{-1}$. This Example demonstrates the use of mixed metal oxide pillars.

1.7 Catalyst G

Al—Mg-PILC (Modification of the Method of U.S. Pat. No. 4,248,739, Example 9)

54 g of 50% strength Chlorhydrol (aluminum chlorohydrate obtained from Reheis) are diluted with distilled water to give a volume of 1.6 l. A solution of 41 g of $MgCl_2 6H_2O$ in 400 ml of distilled water is added. After stirring for 3 days, 100 g of a natural montmorillonite are added and the mixture is stirred at 70° C. for 1 h. The Al—Mg-PILC thus formed is separated off by filtration, washed twice with 1 l of hot distilled water each time, dried at 110° C. overnight and calcined at 200° C. for h. 54.8 g of this Al—Mg-PILC are suspended in 1l of 5M $H_2SO_4$ and stirred at 60° C. for 12 h. The Al—Mg-PILC is separated off by filtration, washed with distilled water, dried at 110° C. overnight and calcined at 200° C. for 5 h. The BET surface area is 237 $m^2g^{-1}$.

1.8 Catalyst H

Cr-PILC (Modification of the Method of Pinnavaia et al., J. Am. Chem. Soc. 107 (1985) 4783)

343.4 g of $Na_2 CO_3 10H_2O$ are slowly added to 6 l of a 0.1M solution of $Cr(NO_3)_3$ and the mixture is stirred at 950° C. overnight. A solution of 40 g of acid-activated montmorillonite in 4 l of distilled water is added. After stirring at 95° C. for 2 h, the Cr-PILC thus formed is separated off by filtration, washed with distilled water, dried at 100° C. for 2 h and calcined at 300° C. for 2 h. The Cr content is 31% as determined by analysis; the BET surface area is 74 $m^2g^{-1}$. 28.3 g of this Cr-PILC are suspended in 1 l of 5M $H_2SO_4$ and stirred at 60° C. for 6 h. The Cr-PILC is separated off by filtration, washed with distilled water, dried at 110° C. overnight and calcined at 200° C. for 5 h. The BET surface area is now 211 $m^2g^{-1}$.

1.9 Catalyst I

Al-PILC (Modification of the Method of Diano et al., Microp. Mat. 2 (1994) 179)

57 g of $AlCl_3 6H_2O$ are dissolved in 1.2 l of distilled water. A solution of 20 g of NaOH in 2.2 l of distilled water is added and the mixture is stirred at 50° C. for another 1 h. 3 l of this solution are added to a suspension of 40 g of sodium montmorillonite in 8 l of distilled water. The pH is adjusted to 5.0 with 9 g of 25% strength ammonia solution and the mixture is stirred at 80° C. for 3 h. The Al-PILC thus formed is separated off by filtration, washed free of chloride, dried at 110° C. overnight and calcined at 200° C. for 5 h. 43 g of the PILC are suspended in 1 liter of 5M $H_2SO_4$ and stirred at 60° C. for 6 h. The Al-PILC is separated off by filtration, washed with distilled water, dried at 110° C. overnight and calcined at 200° C. for 5 h. The Al content is 10.1% as determined by aluminum analysis; the BET surface area is 122 $m^2g^{-1}$.

1.10 Catalyst J

Al—Mg-PILC (Modification of the Method of U.S. Pat. No. 4,248,739, Example 9)

270 g of 50% strength Chlorhydrol (cf. Example 1.5) are diluted with distilled water to give a volume of 8 l. A solution of 205 g of $MgCl_2 6H_2O$ in 2 l of distilled water is added. After stirring for 3 days, 500 g of a natural montmorillonite are added and the mixture is stirred at 70° C. for 1 h. The Al—Mg-PILC thus formed is separated off by filtration, washed with distilled water, dried at 110° C. overnight and calcined at 200° C. for 5 h. The Al—Mg-PILC dried in this manner is suspended in 5 l of 5M $H_2SO_4$ and stirred at 60° C. for 6 h. The Al—Mg-PILC is separated off by filtration, washed with 5 l of distilled water, dried at 110° C. for 16 h and calcined at 200° C. for 5 h. The Al—Mg-PILC dried and acid-exchanged in this manner is treated with 95 g of boehmite and 9.5 g of formic acid. The mixture is compacted in a kneader and kneaded with careful addition of water (295 ml) within 2 h. This mixture is extruded at a pressure of 85 bar to give 2 mm extrudates which are dried at 110° C. for 16 h and calcined at 200° C. for 5 h. The BET surface area is 236 $m^2g^{-1}$.

1.11 Catalyst K

Ti-PILC (Modification of the Method of Sychev et al., supra)

71.1 g of $Ti(O^iPr)_4$ are slowly added dropwise to 1l of 1N hydrochloric acid and the mixture is stirred at room temperature for 3 h. This solution is added to a suspension of 40 g of acid-activated montmorillonite in 2 l of a 1:1 mixture of 1N HCl and acetone. After stirring at room temperature for 3 h, the Ti-PILC thus formed is separated by filtration, washed with distilled water and calcined at 200° C. for 3 h. The BET surface area is 148 $m^2g^{-1}$.

2. Batchwise THF Polymerization 2.1 Telogen 1,4-butanediol

The batchwise polymerization experiments were carried out under a nitrogen atmosphere in 100 ml glass flasks fitted with reflux condensers. 5 g of shaped catalyst articles which had been dried for 18 hours at 180° C./0.3 mbar prior to use to remove adsorbed water were heated at 50° C. in 10 g of butanediol-containing THF (water content: 30 ppm) for 24 hours. Water-containing THF (5% of $H_2O$) was subsequently added to the reaction mixture and the catalyst was separated off by filtration and/or centrifugation. After washing the catalyst three times with 40 g of THF each time, the filtrates were combined and concentrated on a rotary evaporator at 70° C./20 mbar and then in a Kugelrohr oven at 160° C./0.3 mbar for another minutes. PTHF obtained as distillation residue was weighed and analyzed. Table 1 below shows the test results obtained from catalysts A to K.

TABLE 1

| Example | Catalyst | Butanediol [ppm] | Yield [%] | $M_n$ (GPC) | D (GPC) |
|---|---|---|---|---|---|
| 1 | A | 2000 | 25 | 5736 | 11.3 |
| 2 | B | 2000 | 31 | 9054 | 8.4 |
| 3 | C | 2000 | 26 | 11000 | |
| 4 | D | 2000 | 37 | 16000 | |
| 5 | E | 2000 | 31 | 9995 | 6.6 |
| 6 | F | 2000 | 27 | 5320 | 4.0 |
| 7 | G | 2000 | 37 | 11729 | 3.5 |
| 8 | H | 2000 | 24 | 8862 | 8.3 |
| 9 | I | 2000 | 26 | 4810 | 3.9 |
| 10 | J | 2000 | 39 | 6734 | 5.2 |
| 11 | K | 2000 | 33 | 1510 | 1.4 |
| 12 | F | 4000 | 22 | 4693 | 7.4 |
| 13 | F | 8000 | 13 | 2578 | 4.8 |

$M_n$ = number average molar weight of PTHF; polydispersity D = $M_w/M_n$ 2.2 Telogen
Acetic Anhydride Unlike the polymerization of THF described above in which 1,4-butanediol was used as telogen, the batchwise polymerization experiments using acetic anhydride (AA) were carried out at 60° C., and the reaction time was only 5 h. 1.0% by weight of AA were used instead of 0.2% by weight of butanediol. Procedure, proportions used and work-up were as described for operation using butanediol. Use of PILC catalyst J gave a THF conversion of 18%. The average molecular mass was 4829 Dalton as determinded by GPC, and a polydispersity of 3.5 was determined.

3. Continuous THF Polymerization 3.1 Telogen 1,4-butanediol

A 250 ml fixed-bed reactor was packed under argon with 250 ml (177 g) of the aluminum-magnesium-PILC catalyst J which had been dried at 180° C./0.3 mbar for 20 h. The catalyst was covered with THF (water content: <0.01% by weight) during the packing operation. The catalyst was washed twice with 300 ml of THF comprising 0.4% by weight of 1,4-butanediol (BDO) each time to remove catalyst dust. A circulation pump was used for circulating the reaction mixture. After completely charging reactor, pump and tubes with THF to which 0.4% by weight of BDO had been added, the circulation pump was switched on, the reaction temperature was adjusted to 50° C. and 20 g of THF comprising 4000 ppm of BDO and corresponding to a space velocity of 0.08 $kg_{THF}l_{Cat.}{}^{-1}h^{-1}$ were metered in continuously. The circulation/feed ratio was about 20. The average molecular weight $M_n$ of the PTHF obtained was adjusted to about 2000 dalton, as determined by GPC and $^1$H-NMR, by reducing the BDO content to 0.2% by weight, at a conversion of 1.9% corresponding to a space-time yield of 1.5 $g_{PTHF}l_{Cat.}{}^{-1}h^{-1}$. THF conversions were determined after removal of residual THF by distillation (60° C., 60 mbar) and Kugelrohr distillation (150° C., 0.3 mbar).

We claim:

1. A process for polymerizing cyclic ethers of the formula (I)

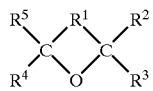

(I)

where $R^1$ is 1 to 8 carbon atoms, which may be substituted with at least one radical selected from the group consisting of $R^6$ and $R^7$, and $R^2$, $R^3$, $R^4$, $R^5$, $R^6$, and $R^7$ are each independently of one another hydrogen, a saturated or mono-or polyunsaturated alkyl group having 1 to 4 carbon atoms or an aryl group having 6 carbon atoms, where at least two radials selected from the group consisting of $R^2$, $R^3$, $R^4$, $R^5$, $R^6$, and $R^7$ may be linked via 2 to 8 carbon atoms, which may be substituted with at least one radical selected from the group consisting of $R^6$ and $R^7$, over a heterogeneous catalyst, which comprises using a heterogeneous catalyst comprising one or more pillared interlayered clays (PILCs), wherein the PILC(s) consist(s) of layer compounds intercalated with one or more metal oxide(s) and/or metal sulfide(s) of elements of main groups III or IV of the Periodic Table of Elements or of elements of the transition groups, mixtures thereof or mixtures of one or more of the metal oxides and/or metal sulfides with other metal oxides and/or metal sulfides.

2. A process as claimed in claim 1, wherein the layer compound is selected from the group consisting of clay mineral, α-zirconium phosphate, tetrasilicon mica, brucite, silicic acid type I and rectorite.

3. A process as claimed in claim 1, wherein the layer compound was treated with one or more acids or one or more ammonium and/or amine salt solutions prior to or after intercalation of one or more of said metal compounds.

4. A process as claimed in claim 1, wherein the layer compound was doped with one or more transition metal ions or rare earth ions selected from the group consisting of titanium, zirconium, niobium, molybdenum, tungsten, iron, cobalt, rhenium, nickel, yttrium, lanthanum, and cerium ions prior to or after intercalation of one or more metal compounds.

5. A process as claimed in claim 1, wherein one or more cyclic ethers are used in a mixture with at least one compound selected from the group consisting of water, alkanediols, alkenediols, alkynediols having 1–12 carbon atoms, polytetrahydrofuran(PTHF) having a molecular weight of about 200–700 dalton, a monocarboxylic acid having 1–10 carbon atoms, and a carboxylic anhydride of monocarboxylic acids having 2–20 carbon atoms.

6. A process as claimed in claim 5, wherein one or more cyclic ethers are used in a mixture with at least one compound selected from the group consisting of water, 1,4-butandiol and/or 2-butyne-1,4-diol, polytetrahydrofuran (PTHF) having a molecular weight of about 200–700 dalton, formic acid, acetic acid, propionic acid, 2-ethylhexanoic acid, acrylic acid, methacrylic acid, acetic anhydride, propionic anhydride and/or butyric anhydride.

7. A process as claimed in claim 1, wherein the heterogeneous catalyst is used in an amount of about 1–90% by weight, based on the weight of the cyclic ether(s).

8. A process as claimed in claim 1, wherein the heterogeneous catalyst used is a pillared clay which has been shaped, with a binder, to give a shaped article and then calcined at about 150–600° C.

9. A process as claimed in claim 1, wherein the product of the process comprises PTHF.

10. A process as claimed in claim 1, wherein the product of the process has an average molecular weight of about 500 to 10,000 dalton.

* * * * *